United States Patent
Fung et al.

(10) Patent No.: US 9,150,718 B2
(45) Date of Patent: Oct. 6, 2015

(54) WEATHER-RESISTANT CROSSLINKED POLYOLEFIN COMPOSITION, POLYOLEFIN SHEET MADE FROM THE SAME AND METHOD FOR MAKING THE SHEET

(71) Applicant: NAN YA PLASTICS CORPORATION, Taipei (TW)

(72) Inventors: Dein-Run Fung, Taipei (TW); Ying-Te Huang, Taipei (TW); Chao-Hsien Lin, Taipei (TW); Ching-Yao Yuan, Taipei (TW); Tzai-Shing Chen, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 269 days.

(21) Appl. No.: 13/855,020

(22) Filed: Apr. 2, 2013

(65) Prior Publication Data

US 2013/0267645 A1    Oct. 10, 2013

(51) Int. Cl.
 *C08L 23/26* (2006.01)
 *C08J 5/18* (2006.01)

(52) U.S. Cl.
 CPC .. *C08L 23/26* (2013.01); *C08J 5/18* (2013.01); *C08J 2323/12* (2013.01); *C08J 2423/06* (2013.01)

(58) Field of Classification Search
 CPC ...... C08J 5/18; C08J 2323/12; C08J 2423/06; C08L 23/26
 USPC .................................. 524/497, 524; 264/293
 See application file for complete search history.

(56) References Cited

U.S. PATENT DOCUMENTS

2007/0219334 A1*   9/2007  Li Pi Shan et al. ........... 526/348

\* cited by examiner

*Primary Examiner* — Ling Choi
*Assistant Examiner* — Chun-Cheng Wang
(74) *Attorney, Agent, or Firm* — Bacon & Thomas, PLLC

(57) ABSTRACT

A weather-resistant crosslinked polyolefin composition is a novel formula containing a comprehensive mixture constituted by crosslinking agent, antistatic agent, $TiO_2$ sized in nanometer and $TiO_2$ sized in micrometer and essential components including polyolefin composition resin, lubricant auxiliary crosslinking agent, antioxidant, UV absorber and filler etc; this novel formula is particularly suited to produce a weather-resistant crosslinked polyolefin sheet with a calender machine instead of an extruder conventionally used, and the polyolefin sheets produced thereof are excellent in both heat-resistant and weather-resistant as well as in a high-quality sheet surface and capably made at a high yield rate through the calender machine.

14 Claims, 1 Drawing Sheet

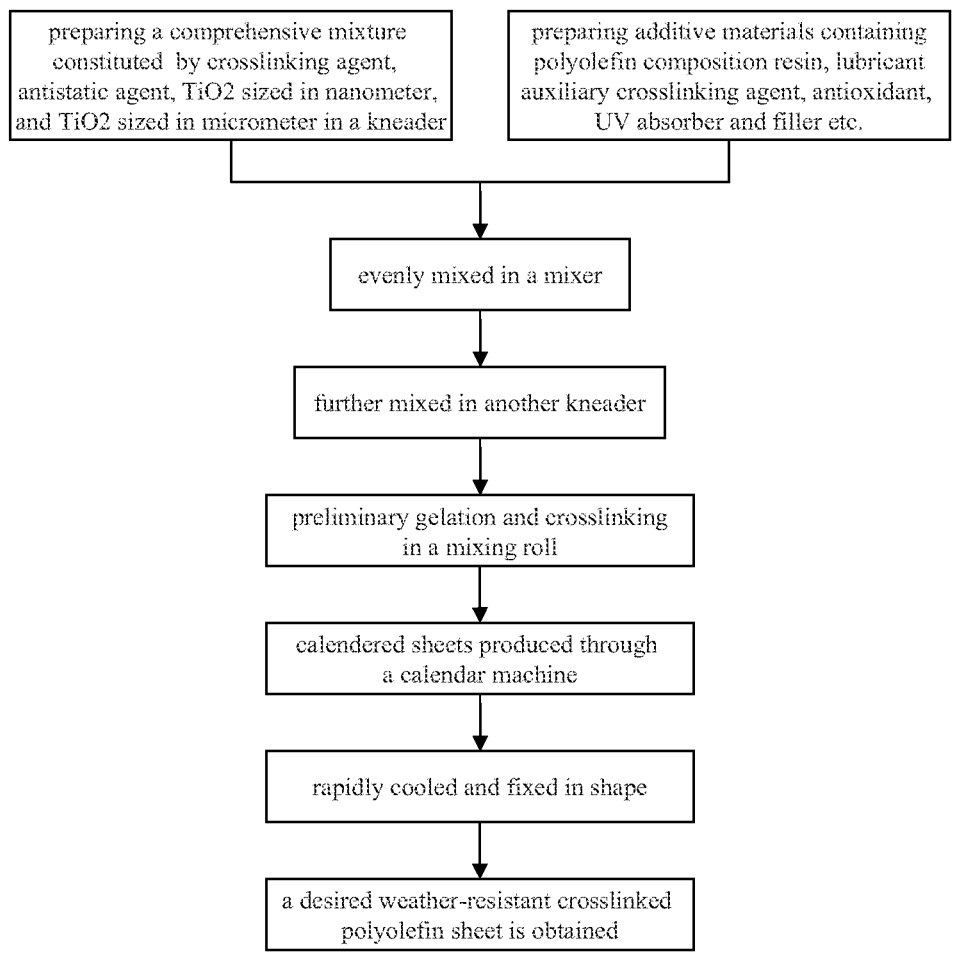

WEATHER-RESISTANT CROSSLINKED POLYOLEFIN COMPOSITION, POLYOLEFIN SHEET MADE FROM THE SAME AND METHOD FOR MAKING THE SHEET

BACKGROUND OF THE PRESENT INVENTION

1. Field of the Invention

The present invention relates to a weather-resistant crosslinked polyolefin composition. More particularly, the present invention relates to a weather-resistant crosslinked polyolefin sheet produced through a calendering process carried out by a calender machine, and to a method for making the sheet.

2. Description of Related Art

Polyolefin films commercially available in the prior art, such as polyethylene (PE) sheets or ethylene-vinyl acetate (EVA) copolymer sheets, all have defects in low heat resistance and low weatherability. On the other hand, weather-resistant plastic sheets for outdoor use are mostly made from polyvinyl chloride (PVC), when burned, which generates pollutants such as dioxins largely impacted on the environment and ecology.

To improve the performance of the polyolefin, either chemical or physical crosslinking is typically used to form covalent bonds between linear or branched polyolefin molecular chains. Once the polyolefin's structure is turned from an original linear polyolefin structure into a mesh or web-like structure, the crosslinked polyolefin is highly improved in heat resistance, wear resistance, viscous deformation, weather resistance and impact resistance.

Methods for crosslinking polyolefin in prior arts have three ways, i.e., radiation crosslinking method, peroxide crosslinking method and silane crosslinking method. The radiation crosslinking method involves the use of radiation equipment. The peroxide crosslinking method requires a peroxide crosslinking agent and must be performed at a specific temperature in order for the crosslinking reaction to take place. Compared with the radiation crosslinking method, the peroxide crosslinking method is advantageously more adaptive and produces higher-performance crosslinked products.

Nevertheless, a polyolefin if completely undergone a peroxide crosslinking reaction (hereinafter referred to as a crosslinked polyolefin) may present a problem in that it is not suitable for use of extrusion mechanism to produce a crosslinked polyolefin film or sheet (hereinafter collectively referred to as a crosslinked polyolefin sheet) having an uniform or even surface.

For example, both U.S. Pat. No. 6,187,847 and No. 6,656,986 disclose how a crosslinked polyolefin sheet can be made by an extrusion machine. During the mixing stage before extrusion, the process temperature must stay lower than the decomposition temperature of the peroxide used. Otherwise, some of the polyolefin will be crosslinked prematurely, causing scorching of the resultant crosslinked polyolefin film or aggregations of insoluble matter (known as fisheyes) which will compromise the surface quality of the crosslinked polyolefin film. However, if the process temperature in the mixing stage is too low, the crosslinked polyolefin resin may gel so poorly that a crosslinked polyolefin sheet cannot be evenly extruded.

SUMMARY OF THE INVENTION

One primary object of the present invention is to disclose formulas of a weather-resistant crosslinked polyolefin composition from which a high-quality crosslinked polyolefin sheet can be made at a high yield rate with a calender machine, more particularly no extruder or radiation equipment is used. The crosslinked polyolefin sheet thus made is resistant not only to heat and weather, but also resistant to creep or plastic deformation typically happened on polymers, as well as resistant to external impact. Hence, the present invention is capable of effectively solves the problem of which conventional extruded crosslinked polyolefin films processed by extruder machine are prone to have scorch marks or fisheyes on the film surface.

The ingredients of the disclosed weather-resistant crosslinked polyolefin composition include a polyolefin composition resin, a comprehensive mixture and additional coagents. The ingredients of the polyolefin composition resin include two or more selected from polyethylene (PE), polypropylene (PP), and an ethylene-vinyl acetate (EVA) copolymer. The ingredients of the comprehensive mixture include, based on the total weight of the comprehensive mixture, 0.1-3 wt % of a crosslinking agent, 0.1-1.5 wt % of an antistatic agent, 0.1-1.5 wt % of $TiO_2$ sized in nanoparticles, and 94-99.7 wt % of $TiO_2$ sized in microparticles. The coagents include one or more of a main crosslinking agent, an auxiliary crosslinking agent, a lubricant, an antioxidant, a UV absorber, a light stabilizer, a filler, and a colorant.

Another primary object of the present invention is to disclose a method for making a weather-resistant crosslinked polyolefin sheet, wherein the method features uniform dispersal of the crosslinking agent used and proper control of the temperature of decomposition reaction so that a calender machine can be directly used to make the weather-resistant crosslinked polyolefin sheet. During the process of the disclosed method, the ingredients of a weather-resistant crosslinked polyolefin composition of the present invention are capable of preventing from non-uniform crosslinking (i.e., some of the ingredients are crosslinked while others are not). In addition, the use of a lubricant and an antistatic agent in appropriate amounts prevents the rollers of the calender machine from sticking to the crosslinked polyolefin sheet being calendered, so as for the resultant crosslinked polyolefin sheet to have a very high-quality sheet surface.

The disclosed method for producing a weather-resistant crosslinked polyolefin sheet is such that not only a calender machine is directly used to make the crosslinked polyolefin sheet, but also the crosslinked polyolefin sheet is excellent in both heat-resistant and weather-resistant as well as has a high-quality sheet surface. The method includes the following steps:

1. Preparing a Comprehensive Mixture $TiO_2$ particles sized in nanometer (hereinafter referred to as $TiO_2$ nanoparticles) are added to $TiO_2$ particles sized in micrometer (hereinafter referred to as $TiO_2$ microparticles), along with a main crosslinking agent and an antistatic agent. The aforesaid ingredients are evenly mixed in a kneader at a low temperature, or more particularly at a process temperature lower than the decomposition temperature of the main crosslinking agent, and a comprehensive mixture is thus produced.

The $TiO_2$ nanoparticles sized between 1 nm and 100 nm are made up 0.1-1.5 wt % of the comprehensive mixture. The $TiO_2$ nanoparticles are added so that a proper crosslinking reaction can take place between the main crosslinking agent and a resin at a mixing roll at 150-220° C., thereby increasing the weather resistance and physical strength of the final product.

The $TiO_2$ microparticles sized greater than 0.1 μm serve as a carrier for uniformly dispersing a small portion of the crosslinking agent. In addition, thanks to their outstanding shielding ability, the $TiO_2$ microparticles, if used in an appropriate amount, can double as a colorant and increase the reflectivity of the resultant polyolefin sheet. Moreover, the $TiO_2$ microparticles are highly UV-absorbent and can enhance the weather resistance of the resultant polyolefin sheet.

2. Preparing a Weather-Resistant Crosslinked Polyolefin Gel

A polyolefin composition resin, the comprehensive mixture and additional coagents are put into a mixer and evenly mixed. The mixture is then introduced into another kneader for further mixing. After that, the mixture is guided to a mixing roll, where the temperature of the mixture is controlled at 150-220° C., and where sufficient crosslinking and gelation take place. The resultant weather-resistant crosslinked polyolefin composition gel is cut into strips.

3. Inputting the weather-resistant crosslinked polyolefin gel obtained from the previous step to a calender machine so that the gel is formed into a hot-melted polyolefin sheet by calendering; embossing the hot-melted polyolefin sheet if so desired; and cooling the hot-melted polyolefin sheet rapidly to produce the weather-resistant crosslinked polyolefin sheet.

To ensure a proper degree of crosslinking, the calender machine operates under the following calendering conditions: the surface temperature of the rollers of the calender machine is controlled at 170-220° C., the production speed is controlled at 10-100 meters per minute, and sheet thickness is controlled at 0.05-1.0 mm. After the calendering process, the hot-melted polyolefin sheet may optionally pass through an embossing apparatus to have patterns embossed on the sheet. Then, the polyolefin sheet is transferred by multiple cooling rollers in order to be rapidly cooled. Thus, the weather-resistant crosslinked polyolefin sheet of the present invention is completed.

The disclosed method for producing a weather-resistant crosslinked polyolefin sheet is directly applicable to a traditional process for producing polyvinyl chloride (PVC) sheet, it is not necessarily to additively modify the existing equipment. Hence, the present invention enables a low processing cost and high production speed. More importantly, the resultant weather-resistant crosslinked polyolefin sheet has high physical strength, is resistant to both heat and weather, and has a high-quality sheet surface free of scorch marks, fisheyes, or like defects.

The weather-resistant crosslinked polyolefin sheet of the present invention can be used, among many other applications, as a weather-resistant polyethylene vinyl acetate (PEVA) film for use on the back panel of a solar cell, or as other industrial films requiring high weather resistance.

BRIEF DESCRIPTION OF THE DRAWINGS

FIG. 1 is a flow chart for producing a weather-resistant crosslinked polyolefin sheet according to one preferred embodiment of the present invention.

DETAILED DESCRIPTION OF THE INVENTION

The present invention provides a weather-resistant crosslinked polyolefin sheet which can be made by a calender machine through a calendering process. The polyolefin sheet can be made from weather-resistant crosslinked polyolefin compositions of the various formulas disclosed herein so as to have different degrees of crosslinking and a thickness ranging from 0.05 mm to 1.0 mm.

The aforesaid weather-resistant crosslinked polyolefin composition has the following ingredients: 100 PHR (parts per hundred resin by weight) of a polyolefin composition resin, 0.1-35 PHR of a comprehensive mixture, 0.01-2 PHR of an auxiliary crosslinking agent, 0.1-15 PHR of a lubricant, 0.1-5 PHR of an antioxidant, 0.1-3 PHR of a UV absorber, 0.1-30 PHR of a filler, and 0-35 PHR of a colorant.

Based on the total weight of the comprehensive mixture, the ingredients of the comprehensive mixture include: 0.1-3 wt % of a main crosslinking agent, 0.1-1.5 wt % of an antistatic agent, 0.1-1.5 wt % of $TiO_2$ nanoparticles and 94-99.7 wt % of $TiO_2$ microparticles.

The polyolefin composition resin is a crosslinked thermoplastic resin and may be a homopolymer, or a copolymer of two or more comonomers, or a blend of one or more polymers. The monomers for use in making such a homopolymer or copolymer may have 2 to 20 carbon atoms and preferably have 2 to 12 carbon atoms.

In one embodiment of the present invention, the polyolefin composition resin is a composition including two or more selected from the group consisting of polyethylene (PE), polypropylene (PP) and ethylene-vinyl acetate (EVA) copolymer.

A preferred embodiment of the polyolefin composition resin includes, with the polyolefin composition resin making up 100 PHR, 20-50 PHR of polyethylene (PE), 30-60 PHR of polypropylene (PP) and 0.1-30 PHR of ethylene-vinyl acetate (EVA) copolymer.

The polyethylene (PE) may be of a homogeneous phase or of multiple phases. A homogenous-phase polyethylene typically has a degree of polydispersity (Mw/Mn) ranging from about 1.5 to 3.5 and features essentially uniform comonomer distribution, wherein Mw is the weight-average molecular weight and Mn is the number-average molecular weight. On the other hand, a multiphase polyethylene has a degree of polydispersity (Mw/Mn) greater than 3.5 and features non-uniform comonomer distribution.

The polyethylene (PE) may be an ethylene homopolymer; a copolymer or a mixture of ethylene and an α-olefin having 3 to 12 carbon atoms, preferably 4 to 8 carbon atoms (e.g., a diene, if necessary); or a blend of such homopolymers and copolymers. The α-olefin may be selected from propylene, 1-butylene, 1-hexene, 4-methyl-1-pentene and 1-octene.

The polyethylene (PE) may also be a copolymer of ethylene and an unsaturated ester, such as a vinyl ester (vinyl acetate) or an acrylate (methacrylate).

A preferred embodiment of the polyethylene (PE) is selected from a high-density polyethylene (HDPE), a low-density polyethylene (LDPE), a linear low-density polyethylene (LLDPE) or a metallocene polyethylene (mPE), depending on the physical properties required for the application.

The polypropylene (PP) may be either a propylene homopolymer or a copolymer of propylene and one or more other α-olefins, wherein the polymer of propylene constitutes at least about 60% by weight of the copolymer.

A preferred embodiment of the polypropylene (PP) is selected from a polypropylene homopolymer (PP-H), a polypropylene block copolymer (PP-B) or a polypropylene random copolymer (PP-R).

In order to increase bonding strength on the surface of packaging material, the polyolefin composition resin include ethylene-vinyl acetate (EVA) copolymer. The ethylene-vinyl acetate (EVA) copolymer has a vinyl acetate (VA) content of 8-33%. A higher or lower VA content will have adverse effects on the operation of the calender machine used or on bonding strength. In a preferred embodiment, the VA content is 18-33%.

By using a combination of the various polyolefin resins stated above and properly adjusting the content of each resin, the weather-resistant crosslinked polyolefin sheet of the present invention can be provided with the desired physical properties and high processability.

The main crosslinking agent used in the comprehensive mixture is an organic peroxide, particularly an organic peroxide whose decomposition temperature lies between 110 and 220° C. and whose half-life is 10 minutes. The term "half-life" refers to the time required for the active oxygen in a peroxide to decompose, at a specific temperature, to one half of its original content.

The main crosslinking agent functions in the following manner. When heated over its decomposition temperature, the peroxide (i.e., the crosslinking agent) begins to decompose and react with the polyolefin resins, thereby generating free radicals. Consequently, a mesh or web-like structure is formed by crosslinking. This mesh or web-like structure greatly enhances the physical properties (e.g., heat resistance and tensile strength) of the final product of the polyolefin resins.

The main crosslinking agent may be selected from the following compounds (with the numbers in the parentheses indicating their respective decomposition temperatures, in the unit of ° C.): succinic acid peroxide (110° C.), benzoyl peroxide (110° C.), tert-butyl peroxy-2-ethylhexanoate (113° C.), p-chlorobenzoyl peroxide (115° C.), tert-butyl peroxyisobutyrate (115° C.), tert-butyl peroxyisopropyl carbonate (135° C.), tert-butyl peroxylaurate (140° C.), 2,5-dimethyl-2,5-bis(benzoylperoxy)hexane (140° C.), tert-butyl peroxyacetate (140° C.), di-tert-butyl diperoxyphthalate (140° C.), tert-butyl monoperoxymaleate (140° C.), cyclohexanone peroxide (145° C.), tert-butyl peroxybenzoate (145° C.), dicumyl peroxide (150° C.), 2,5-dimethyl-2,5-bis(tert-butylperoxy)hexane (155° C.), cumyl tert-butyl hydroperoxide (155° C.), tert-butyl hydroperoxide (158° C.), di-tert-butyl peroxide (160° C.), 2,5-dimethyl-2,5-bis(tert-butylperoxy)-3-hexyne (170° C.), and $\alpha,\alpha'$-di-tert-butylperoxy-1,4-diisopropylbenzene (160° C.).

A preferred embodiment of the main crosslinking agent is 2,5-dimethyl-2,5-bis(tert-butylperoxy)-3-hexyne (170° C.) or $\alpha,\alpha'$-di-tert-butylperoxy-1,4-diisopropylbenzene (160° C.), both of which have relatively high decomposition temperatures that not only enable easy control of the physical properties and surface quality consistency of the weather-resistant crosslinked polyolefin sheet of the present invention, but also prevent crosslinking from taking place in an early stage of the process (e.g., in the mixer or kneader). Should crosslinking take place too early, subsequent stages will be difficult to carry out.

The auxiliary crosslinking agent is intended to increase the crosslinking degree by serving as a coagent in peroxide crosslinking or free radical reaction crosslinking. The auxiliary crosslinking agent may be one or a mixture of diene, triene, or tetraene compounds with two C—C terminal double bonds, such as 1,9-decadiene; 1,7-octadiene; 1,5-hexadiene; 1,4-pentadiene; 1,3-butadiene; 1,3,5-hexatriene; or 2,3-dimethyl-1,3-butadiene.

The $TiO_2$ nanoparticles are also a crosslinking coagent and can advance a proper crosslinking reaction between the polyolefin composition resin and the main crosslinking agent at a mixing roll where the material temperature is kept at 150-220° C. Thus, the degree of crosslinking can be increased without having to resort to radiation, and the resultant polyolefin film is uniform in terms of both appearance and physical properties.

A preferred embodiment of the auxiliary crosslinking agent is triallyl isocyanurate or trimethylolpropane triacrylate. In a more preferred embodiment, the $TiO_2$ nanoparticles work in conjunction with an auxiliary crosslinking agent such as an aforementioned diene so that crosslinks can be formed more effectively.

The use of the lubricant is critical to the processing of the polyolefin resins at a calender machine. As is well known, a polyolefin material, when in a high-temperature molten state, is very tacky and tends to stick to rollers. Should that happen, the required torsion of the rollers will be increased, making it difficult to process the polyolefin material. In the present invention, therefore, an internal lubricant is used together with an external lubricant. Applicable external lubricants include $C_{12-18}$ fatty acid-based lubricants and fatty acid ester-based lubricants, preferably a stearic acid.

Lubricants suitable for use as both the internal lubricant and the external lubricant are fatty acid amide-based, metal carboxylate-based, or organosilicon-based. Applicable internal lubricants include fatty acids higher than $C_{20}$ and paraffin hydrocarbon-based lubricants.

By using a combination of the various internal and external lubricants, not only are the polyolefin resins prevented from sticking to the metallic roller surfaces of the calender machine used, but also the polyolefin resins are easily compatible with and can readily gel with the lubricants.

In the present invention, the internal, internal/external, and external lubricants make up 0.1-15 PHR. Based on the total weight of the lubricants, the external lubricant constitutes 40-70 wt %, and the internal and internal/external lubricants constitute 30-60 wt %. The external lubricant is $C_{12}$-$C_{18}$ fatty acid-based.

The use of the antistatic agent is a technical feature of the present invention. Static electricity sparks are very likely to occur when a crosslinked polyolefin is rolled, over a large area, between the rollers of a calender machine or banks up on the rollers. In the present invention, with a view to facilitating the processing of the polyolefin resins with a calender machine, the antistatic agent is added into the composition during the manufacturing process. The antistatic agent provides the polyolefin resins with surface conductivity and thereby prevents the generation of sparks. In the present invention, the antistatic agent is continuously supplied to the plastic surface to make up for the portion wiped off from the surface.

A preferred embodiment of the antistatic agent is one or a mixture of an ethoxy glycerol fatty acid ester derivative, a phosphate ester derivative, an aliphatic amine derivative, and other alcohol derivatives, such as an alkyl phosphate ester and a polyethylene glycol stearate.

The antioxidant, which is used to stop the lengthening of chains, may be one or a mixture of a hindered phenol antioxidant and a phosphite antioxidant.

The UV absorber serves to eliminate the free radicals generated during UV radiation, thus preventing an undesirable increase in chain length while reducing the chances of photodegradation or photo-oxidation. The UV absorber may be one or a mixture of a benzophenone UV absorber, a benzotriazole UV absorber and a hindered amine UV absorber.

The filler serves to improve the physical properties of the weather-resistant crosslinked polyolefin composition and may be one or a mixture of calcium carbonate, clay, talcum powder, mica powder, limestone, and silicon flour.

The colorant is added according to color requirements of the end product and may be one or a mixture of an organic colorant and an inorganic colorant. The colorant may be selected from carbon black, titanium white ($TiO_2$), phthalocyanine green, phthalocyanine blue, cobalt blue, quinacridone red, cadmium mercury red, cadmium yellow, chrome yellow, azo yellow, chrome green, ultramarine blue and iron oxide red ($Fe_2O_3$).

$TiO_2$ has outstanding shielding ability. Therefore, in addition to functioning as a colorant, the $TiO_2$ particles in the present invention can, when used in an appropriate amount, increase the reflectivity of the resultant polyolefin film, making the polyolefin film more weather-resistant. In particular, a solar cell using such a polyolefin film will have high power generation efficiency and a long service life. In the present invention, the micron-scale $TiO_2$ is highly absorbent to the crosslinking agent and enables the crosslinking agent to disperse evenly in the resins without generating scorch marks.

The present invention also provides a method for making a weather-resistant crosslinked polyolefin sheet, wherein only a small amount of crosslinking agent is required, and wherein the crosslinking agent is evenly dispersed in resins through a low-temperature dispersing process so as to crosslink evenly with the resins in a subsequent forming process, giving the resultant weather-resistant crosslinked polyolefin sheet enhanced physical properties.

As shown in FIG. 1, the method for producing a weather-resistant crosslinked polyolefin sheet involves the addition of a main crosslinking agent, an auxiliary crosslinking agent, a lubricant, an antioxidant, a UV absorber, a light stabilizer, a filler, and an optional colorant, wherein the types and amounts of the aforesaid ingredients depend on the desired properties of the crosslinked sheet. The method includes the following steps:

1. Preparing a Comprehensive Mixture $TiO_2$ nanoparticles (0.1-1.5 wt % of the comprehensive mixture), a main crosslinking agent (0.1-3 wt % of ditto) and an antistatic agent (0.1-1.5 wt % of ditto) are added to $TiO_2$ microparticles (94-99.7 wt % of ditto). The aforesaid ingredients are evenly mixed in a kneader at a low temperature to produce the comprehensive mixture.

2. Preparing a Weather-Resistant Crosslinked Polyolefin Composition Gel

A polyolefin composition resin (100 PHR), the comprehensive mixture (0.1-35 PHR), an auxiliary crosslinking agent (0.01-2 PHR), a lubricant (0.1-15 PHR), an antioxidant (0.1-5 PHR), a UV absorber (0.1-3 PHR), a filler (0.1-30 PHR), and a colorant (0-35 PHR) are evenly mixed in a mixer, then introduced into another kneader for further mixing, and then delivered to a mixing roll for preliminary gelation and crosslinking, where the material temperature is controlled at 150-220° C. Once sufficiently crosslinked and gelled, the product of the mixing roll is cut into strips.

3. Inputting the weather-resistant crosslinked polyolefin gel obtained from the previous step to a calender machine for calendering; and passing the calendered product through an optional embossing process and then a rapid cooling process to produce a weather-resistant crosslinked polyolefin sheet.

The calendering conditions of the calender machine are as follows to ensure a proper degree of crosslinking: the roller surfaces of the calender machine are controlled at 170-200° C., the production speed is controlled at 10-100 meters per minute, and sheet thickness is controlled at 0.05-1.0 mm. The calendered sheet may be optionally embossed by an embossing apparatus. Then, the sheet is guided through a plurality of cooling rollers so as to be rapidly cooled and fixed in shape. Once rolled onto a reel, the desired weather-resistant crosslinked polyolefin sheet is obtained.

In the present invention, polyolefin resins of different characteristic tackinesses are used in combination to make the resultant gel suitable for being calendered by a calender machine. Further, the types and amounts of the polyolefin resins can be adjusted according to the use and desired physical properties of the weather-resistant crosslinked polyolefin sheet. The method disclosed herein for making a weather-resistant crosslinked polyolefin sheet advantageously features a simple process, low equipment cost, and high production speed.

A weather-resistant crosslinked polyolefin sheet made in accordance with the present invention is applicably served as a weather-resistant polyethylene vinyl acetate (PEVA) film for use on the back panel of a solar cell, or as other industrial films requiring high resistance to weather.

The present invention is hereinafter described in more detail by way of the preferred embodiments, which, however, are not restrictive of the scope of the present invention.

In the disclosed embodiments, physical property evaluation was carried out using the following methods:

1. Determination of the Degree of Crosslinking:

A sample is extracted with xylene at 120° C. for 6 hours, and all that remains undissolved is crosslinked polyolefin. Assuming the sample has a total weight of $W_1$ and the undissolved matter weighs $W_2$, the crosslinking degree of polyolefin is:

$$\text{Crosslinking degree} = W_2/W_1 \times 100\%$$

2. Reflectivity Analysis:

Ten samples, each measuring 5 cm×5 cm, are taken from a crosslinked film. Then, a spectrophotometer is used, with a wavelength setting at 550 $cm^{-1}$, to determine the reflectivity (%) of each sample.

3. Evaluation of Weather Resistance:

A sample is placed in a QUV accelerated weathering testing machine for 500, 1000, and 2000 hours and then subjected to the ASTM D-638 tensile strength test and the ASTM D-624 tear strength test.

4. Processability on Roller Surfaces:

The ingredients of a certain formula are mixed at a test roll at 190° C., with a roller spacing of 0.4 mm. The mixing process continues until the mixture begins to stick to the rollers. The longer it takes for the mixture to stick to the rollers, the higher the processability.

Embodiment 1

A weather-resistant crosslinked polyolefin sheet having a thickness of 0.10 mm (hereinafter referred to as a crosslinked polyolefin sheet for short) was produced by the following steps:

1. The comprehensive mixture was prepared according to the formula of embodiment 1 in table 1, wherein the $TiO_2$ microparticle content was 10 PHR.
2. Based on the formula of embodiment 1 in table 1, the polyolefin composition resin (in which the VA content of EVA was 8-33%), the comprehensive mixture, the lubricants, and the coagents (including 0.1 PHR of an auxiliary crosslinking agent, 0.1 PHR of an antioxidant, 0.3 PHR of a UV absorber and 0.5 PHR of a filler) were thoroughly mixed in a mixer and then guided to another kneader for further mixing and gelation. The working temperature of the kneader was set at 130° C.-150° C., which is lower than the decomposition temperature of the organic peroxide used.
3. The mixture resulting from the previous step was guided to a mixing roll, where the material temperature was controlled at 150° C.-220° C. Once sufficiently crosslinked, the mixture was guided to a calender machine, whose process temperature and rotating speed were set at 170°

C.-200° C. and 35 meter/minute respectively. After the calendering process, a crosslinked polyolefin sheet was formed.

4. The sheet was passed through a cooling roller set so as to be cooled and fixed in shape. Then, the 0.1 mm-thick polyolefin sheet was rolled up. The sheet had a crosslinking degree of 7.5%, a tensile strength of 141.5 kg/cm$^2$, and a tear strength of 72 kg/cm$^2$. After 2000-hour irradiation by the QUV, the tensile strength remained at 43.1% of that before the irradiation, and the tear strength at 42.8% of that before the irradiation.

Embodiment 2

1. The comprehensive mixture was prepared according to the formula of embodiment 2 in table 1. The TiO$_2$ microparticle content was 10 PHR.
2. By the same process of embodiment 1, a 0.1 mm-thick crosslinked polyolefin sheet was made according to the formula of embodiment 2 in table 1, with an auxiliary crosslinking agent at 0.1 PHR. The sheet had a degree of crosslinking of 9%, a tensile strength of 145.7 kg/cm$^2$, and a tear strength of 89 kg/cm$^2$. After 2000-hour irradiation by the QUV, the tensile strength remained at 44.7% of that before the irradiation, and the tear strength at 44.9% of that before the irradiation.

Embodiment 3

1. The comprehensive mixture was prepared according to the formula of embodiment 3 in table 1. The TiO$_2$ microparticle content was 10 PHR.
2. By the same process of embodiment 1, a 0.1 mm-thick crosslinked polyolefin sheet was made according to the formula of embodiment 3 in table 1, with an auxiliary crosslinking agent at 0.5 PHR. The sheet had a degree of crosslinking of 11.8%, a tensile strength of 152.2 kg/cm$^2$, and a tear strength of 91 kg/cm$^2$. After 2000-hour irradiation by the QUV, the tensile strength remained at 46.7% of that before the irradiation, and the tear strength at 45.2% of that before the irradiation.

Embodiment 4

1. The comprehensive mixture was prepared according to the formula of embodiment 4 in table 1. The TiO$_2$ microparticle content was 20 PHR.
2. By the same process of embodiment 1, a 0.1 mm-thick crosslinked polyolefin sheet was made according to the formula of embodiment 4 in table 1, with an auxiliary crosslinking agent at 0.5 PHR. The sheet had a degree of crosslinking of 12.3%, a reflectivity of 92%, a tensile strength of 153.2 kg/cm$^2$, and a tear strength of 94.2 kg/cm$^2$. After 2000-hour irradiation by the QUV, the tensile strength remained at 55.5% of that before the irradiation, and the tear strength at 51.2% of that before the irradiation.

Embodiment 5

1. The comprehensive mixture was prepared according to the formula of embodiment 5 in table 1. The TiO$_2$ microparticle content was 20 PHR.
2. By the same process of embodiment 1, a 0.1 mm-thick crosslinked polyolefin sheet was made according to the formula of embodiment 5 in table 1, with an auxiliary crosslinking agent at 0.5 PHR. The sheet had a degree of crosslinking of 12.1%, a reflectivity of 92.1%, a tensile strength of 152.5 kg/cm$^2$, and a tear strength of 93.5 kg/cm$^2$. After 2000-hour irradiation by the QUV, the tensile strength remained at 52.8% of that before the irradiation, and the tear strength at 49.7% of that before the irradiation.

Embodiment 6

1. The comprehensive mixture was prepared according to the formula of embodiment 6 in table 1. The TiO$_2$ microparticle content was 20 PHR.
2. By the same process of embodiment 1, a 0.1 mm-thick crosslinked polyolefin sheet was made according to the formula of embodiment 6 in table 1, with an auxiliary crosslinking agent at 0.5 PHR. The sheet had a degree of crosslinking of 11.5%, a reflectivity of 91.9%, a tensile strength of 150.5 kg/cm$^2$, and a tear strength of 91.7 kg/cm$^2$. After 2000-hour irradiation by the QUV, the tensile strength remained at 48.6% of that before the irradiation, and the tear strength at 46% of that before the irradiation.

Embodiment 7

1. The comprehensive mixture was prepared according to the formula of embodiment 7 in table 1. The TiO$_2$ microparticle content was 20 PHR.
2. By the same process of embodiment 1, a 0.1 mm-thick crosslinked polyolefin sheet was made according to the formula of embodiment 7 in table 1, with an auxiliary crosslinking agent at 0.5 PHR. The sheet had a degree of crosslinking of 11.2%, a reflectivity of 91.8%, a tensile strength of 149.2 kg/cm$^2$, and a tear strength of 91.5 kg/cm$^2$. After 2000-hour irradiation by the QUV, the tensile strength remained at 47.2% of that before the irradiation, and the tear strength at 45.1% of that before the irradiation.

Comparative Example 1

By the same process of embodiment 1, a 0.1 mm-thick uncrosslinked polyolefin sheet was made according to the formula of comparative example 1 in table 1, without using any crosslinking agent. The sheet had a reflectivity of 92%, a tensile strength of 121 kg/cm$^2$, and a tear strength of 60 kg/cm$^2$. After 2000-hour irradiation by the QUV, the tensile strength remained at 34.7% of that before the irradiation, and the tear strength at 35% of that before the irradiation.

Comparative Example 2

By the same process of embodiment 1, a 0.1 mm-thick uncrosslinked polyolefin sheet was made according to the formula of comparative example 2 in table 1, without using any crosslinking agent. The sheet had a reflectivity of 80.5%, a tensile strength of 117.5 kg/cm$^2$, and a tear strength of 62 kg/cm$^2$. After 2000-hour irradiation by the QUV, the tensile strength remained at 29.8% of that before the irradiation, and the tear strength at 32.2% of that before the irradiation.

Comparative Example 3

By the same process of embodiment 1, a 0.1 mm-thick crosslinked polyolefin sheet was made according to the formula of comparative example 3 in table 1, without using TiO$_2$ nanoparticles. The sheet had a degree of crosslinking of 7.0%, a reflectivity of 80.1%, a tensile strength of 140.3 kg/cm$^2$, and a tear strength of 74 kg/cm$^2$. After 2000-hour irradiation by the QUV, the tensile strength remained at 43.0% of that before the irradiation, and the tear strength at 42.4% of that before the irradiation.

Comparative Example 4

By the same process of embodiment 1, a 0.1 mm-thick crosslinked polyolefin sheet was made according to the formula of comparative example 4 in table 1, without using $TiO_2$ microparticles. The sheet had a degree of crosslinking of 8.7%, a reflectivity of only 2.2%, a tensile strength of 142.1 kg/cm², and a tear strength of 75.5 kg/cm². After 2000-hour irradiation by the QUV, the tensile strength remained at 39.1% of that before the irradiation, and the tear strength at 33.1% of that before the irradiation.

Comparative Example 5

By the same process of embodiment 1, a 0.1 mm-thick crosslinked polyolefin sheet was made according to the formula of comparative example 5 in table 1, without using $TiO_2$ nanoparticles or $TiO_2$ microparticles. The sheet had a degree of crosslinking of 7.0%, a reflectivity of only 2%, a tensile strength of 140.2 kg/cm², and a tear strength of 75.1 kg/cm². After 2000-hour irradiation by the QUV, the tensile strength remained at 38.1% of that before the irradiation, and the tear strength at 31.3% of that before the irradiation.

Comparative Example 6

By the same process of embodiment 1, a 0.1 mm-thick crosslinked polyolefin sheet was made according to the formula of comparative example 6 in table 1, the formula including an auxiliary crosslinking agent. The sheet had a degree of crosslinking of 7.3%, a reflectivity of only 2.1%, a tensile strength of 141.1 kg/cm², and a tear strength of 75.3 kg/cm². After 2000-hour irradiation by the QUV, the tensile strength remained at 38.6% of that before the irradiation, and the tear strength at 32.4% of that before the irradiation.

TABLE 1

Formulas, Processability, and Physical Properties of Films Made in the Embodiments and Comparative Examples

| | Formula (PHR)[1] | | Embodiment 1 | 2 | 3 | 4 | 5 | 6 | 7 | Comparative example 1 | 2 | 3 | 4 | 5 | 6 |
|---|---|---|---|---|---|---|---|---|---|---|---|---|---|---|---|
| Resin | PP | | 40 | 40 | 40 | 40 | 40 | 40 | 40 | 40 | 40 | 40 | 40 | 40 | 40 |
| | PE | | 50 | 50 | 50 | 50 | 50 | 40 | 40 | 50 | 50 | 50 | 50 | 50 | 50 |
| | EVA | | 10 | 10 | 10 | 10 | 10 | 10 | 10 | 10 | 10 | 10 | 10 | 10 | 10 |
| Lubricant | Stearate | | 0.3 | 0.2 | 0.3 | 0.3 | 0.2 | 0.3 | 0.3 | — | — | 0.3 | 0.3 | — | 0.3 |
| | Paraffin hydrocarbon | | 0.2 | 0.2 | 0.2 | 0.2 | 0.3 | 0.2 | 0.2 | — | — | — | — | 0.2 | — |
| | Fatty acid amide | | — | — | — | — | — | — | — | 0.3 | 0.3 | — | — | 0.3 | 0.1 |
| Comprehensive mixture | Main crosslinking agent | A[4] | 0.15 | 0.3 | 0.3 | 0.3 | — | — | — | — | — | 0.3 | 0.3 | 0.3 | 0.3 |
| | | B[5] | — | — | — | — | 0.3 | — | — | — | — | — | — | — | — |
| | | C[6] | — | — | — | — | — | 0.3 | — | — | — | — | — | — | — |
| | | D[7] | — | — | — | — | — | — | 0.3 | — | — | — | — | — | — |
| | Antistatic agent[8] | | 0.1 | 0.05 | 0.1 | 0.1 | 0.05 | 0.1 | 0.1 | — | — | — | — | — | — |
| | $TiO_2$ nanoparticles | | 0.1 | 0.1 | 0.1 | 0.1 | 0.1 | 0.1 | 0.1 | — | — | — | 0.1 | — | — |
| | $TiO_2$ microparticles[9] | | 10 | 10 | 10 | 20 | 20 | 20 | 20 | 20 | 10 | 10 | — | — | — |
| Coagent | Crosslinking agent[10] | | 0.1 | 0.1 | 0.5 | 0.5 | 0.5 | 0.5 | 0.5 | — | — | — | — | — | 0.5 |
| | Antioxidant | | 0.1 | 0.1 | 0.1 | 0.1 | 0.1 | 0.1 | 0.1 | 0.1 | 0.1 | 0.1 | 0.1 | 0.1 | 0.1 |
| | UV absorber | | 0.3 | 0.3 | 0.3 | 0.3 | 0.3 | 0.3 | 0.3 | 0.3 | 0.3 | 0.3 | 0.3 | 0.3 | 0.3 |
| | Filler | | 5 | 5 | 5 | 5 | 5 | 5 | 5 | 5 | 5 | 5 | 5 | 5 | 5 |
| Roller-surface processability[11] | | | Good | Good | Good | Very Good | Good | Good | Good | Very Poor | Very Poor | Very Poor | Poor | Poor | Poor |
| properties | Crosslinking degree (%) | | 7.5 | 9 | 11.8 | 12.3 | 12.1 | 11.5 | 11.2 | 0 | 0 | 7.0 | 8.7 | 7.0 | 7.3 |
| | Reflectivity (%) | | 81 | 81 | 81 | 92 | 92.1 | 91.9 | 91.8 | 92 | 80.5 | 80.1 | 2.2 | 2 | 2.1 |
| QUV weather resistance | Tensile strength[2] (kg/cm²) | 0 hr | 141.5 | 145.7 | 152.2 | 153.2 | 152.5 | 150.5 | 149.2 | 121 | 117.5 | 140.3 | 142.1 | 140.2 | 141.1 |
| | | 500 hr | 113.5 | 119.5 | 127.3 | 148.4 | 147.6 | 140.2 | 140.4 | 110 | 100.5 | 113 | 95.2 | 94.1 | 94.5 |
| | | 1000 hr | 91.2 | 93.5 | 104.2 | 129.2 | 125.5 | 121.0 | 120.4 | 105 | 85.2 | 89.1 | 77.3 | 75 | 76.2 |
| | | 2000 hr | 61.0 | 65.2 | 71.2 | 85.1 | 80.6 | 73.2 | 70.5 | 42 | 35 | 60.3 | 55.5 | 53.4 | 54.5 |
| | | Remaining (%) | 43.1 | 44.7 | 46.7 | 55.5 | 52.8 | 48.6 | 47.2 | 34.7 | 29.8 | 43.0 | 39.1 | 38.1 | 38.6 |
| | Tear strength[3] (kg/cm²) | 0 hr | 72 | 89 | 91 | 94.2 | 93.5 | 91.7 | 91.5 | 60 | 62 | 74 | 75.5 | 75.1 | 75.3 |
| | | 500 hr | 53.2 | 69.2 | 75.1 | 86.2 | 85.1 | 82.2 | 81.5 | 55 | 49 | 54.6 | 46.2 | 45.0 | 45.7 |
| | | 1000 hr | 44.1 | 48.3 | 54.3 | 65.3 | 63.7 | 59.4 | 58.2 | 45.2 | 41 | 45.8 | 32.5 | 32.1 | 32.3 |
| | | 2000 hr | 30.8 | 40.0 | 41.2 | 48.3 | 46.5 | 42.2 | 41.3 | 21 | 20 | 31.4 | 25.0 | 23.5 | 24.4 |
| | | Remaining (%) | 42.8 | 44.9 | 45.2 | 51.2 | 49.7 | 46.0 | 45.1 | 35.0 | 32.2 | 42.4 | 33.1 | 31.3 | 32.4 |

Note:
[1] The amounts in each formula are indicated in PHR (parts per hundred resin by weight).
[2] Tensile strength tested according to ASTM D-638.
[3] Tear strength tested according to ASTM D-624.
[4] Crosslinking agent A: 2,5-dimethyl-2,5-bis(tert-butylperoxy)-3-hexyne.
[5] Crosslinking agent B: α,α'-di-tert-butylperoxy-1,4-diisopropylbenzene.
[6] Crosslinking agent C: tert-butyl hydroperoxide.
[7] Crosslinking agent D: succinic acid peroxide.
[8] Antistatic agent: an alkyl phosphate ester.
[9] R-type $TiO_2$: R-780 manufactured by ISHIHARA (particle size: 0.24 μm).
[10] Auxiliary crosslinking agent: triallyl isocyanurate.
[11] Processability on roller surfaces of the calender machine at a working temperature of 190° C. Graded according to the time for which a sheet stayed non-stick to the rollers, with "Very Good" representing the longest non-stick time, "Good" representing the second longest non-stick time, "Poor" representing the second shortest non-stick time, and "Very Poor" representing the shortest non-stick time.

Results
1. The crosslinking degree of the crosslinked polyolefins increased with the content of the peroxide crosslinking agent used, with embodiments 4 and 5 showing the highest crosslinking degrees. Physically speaking, the higher the degree of crosslinking is, the higher the remaining tensile strength and remaining tear strength of the resultant polyolefin sheet will be after long-term use, i.e., the more weather-resistant the resultant polyolefin sheet is. In comparative examples 1 and 2, in which no crosslinking agent was added, the retention rates of tensile strength and tear strength were low.
2. After 2000-hour QUV irradiation, both the remaining tensile strength and the remaining tear strength of the crosslinked polyolefins were higher than those of the uncrosslinked polyolefins. In other words, the crosslinked polyolefins were more weather-resistant than the uncrosslinked polyolefins.
3. The $TiO_2$ microparticle content of 20 PHR in embodiment 4 is higher than those of 10 PHR in embodiments 2 and 3. The reflectivity and weather resistance of the crosslinked polyolefins in embodiments 2-4 increased with the $TiO_2$ microparticle content.
4. Embodiments 4-7 used different crosslinking agents, which vary in decomposition temperature as well as in crosslinking degree. Crosslinking agent A (2,5-dimethyl-2,5-bis(tert-butylperoxy)-3-hexyne) has the highest decomposition temperature, whereas crosslinking agent D (succinic acid peroxide) has the lowest decomposition temperature. A crosslinking agent with the appropriate decomposition temperature can be selected according to resin composition and the temperature and time of gelation.
5. The crosslinked polyolefin sheets made according to the formulas of embodiments 1-7 had even surfaces and no scorch marks. That is to say, the problems of scorching and surface unevenness as are typical of the conventional extrusion method were solved.
6. While comparative example 3 and embodiment 2 used the same amounts of Crosslinking agent A (2,5-dimethyl-2,5-bis(tert-butylperoxy)-3-hexyne) and $TiO_2$ microparticles, the former, in which no $TiO_2$ nanoparticles were added, had a lower crosslinking degree and a slightly lower reflectivity than the latter. Moreover, the polyolefin sheet product of comparative example 3 showed lower weather resistance and a lower physical strength retention rate than that of embodiment 2.
7. While comparative example 4 and embodiment 2 used the same amounts of Crosslinking agent A (2,5-dimethyl-2,5-bis(tert-butylperoxy)-3-hexyne) and $TiO_2$ nanoparticles, the former, in which no $TiO_2$ microparticles were added, had a much lower reflectivity than the latter, despite their similar crosslinking degrees. Consequently, the polyolefin sheet product of comparative example 4 showed lower weather resistance and a lower physical strength retention rate than that of embodiment 2.
8. While embodiments 2-7 and comparative example 5 used the same amount of main crosslinking agent, the polyolefin sheet product of comparative example 5, in which neither $TiO_2$ microparticles nor $TiO_2$ nanoparticles were added, had a lower crosslinking degree, a far lower reflectivity, and a lower weather resistance retention rate than those of embodiments 2-7, in which both kinds of $TiO_2$ particles were added.
9. While embodiments 3-7 and comparative example 6 used the same amount of main crosslinking agent, the polyolefin sheet product of comparative example 6, in which triallyl isocyanurate was added as an auxiliary crosslinking agent but no $TiO_2$ nanoparticles were added, had a lower crosslinking degree and a lower weather resistance retention rate than those of embodiments 3-7, in which both triallyl isocyanurate (as an auxiliary crosslinking agent) and $TiO_2$ nanoparticles were added. This shows that, in a calendering process without using radiation, $TiO_2$ nanoparticles have a faster crosslinking effect than triallyl isocyanurate as a crosslinking coagent.
10. All of embodiments 1-7, in which an antistatic agent was used in conjunction with proper lubricants, had higher roller-surface processability at 190° C. than comparative examples 1-5, in which no antistatic agent was added. The higher processability makes it feasible to make a crosslinked polyolefin sheet with a calender machine.

What is claimed is:

1. A weather-resistant crosslinked polyolefin composition, optionally processed by a calender machine to produce a weather-resistant crosslinked polyolefin sheet, comprising:
   100 PHR (parts per hundred resin) of a polyolefin composition resin comprising:
   20-50 PHR of polyethylene (PE),
   30-60 PHR of polypropylene (PP), and
   0.1-30 PHR of an ethylene-vinyl acetate (EVA) copolymer having a vinyl acetate (VA) content of 8-33%;
   0.1-35 PHR of a mixture comprising, based on a total comprehensive mixture weight thereof, 0.1-3 wt % of a main crosslinking agent, 0.1-1.5 wt % of an antistatic agent, 0.1-1.5 wt % of $TiO_2$ nanoparticles and 94-99.7 wt % of $TiO_2$ microparticles;
   0.01-2 PHR of an auxiliary crosslinking agent;
   0.1-15 PHR of a lubricant;
   0.1-5 PHR of an antioxidant;
   0.1-3 PHR of a UV absorber;
   0.1-30 PHR of a filler; and
   0-35 PHR of a colorant.

2. A method for producing a weather-resistant crosslinked polyolefin sheet produced through a calender machine, comprising the steps of:
   1) adding 0.1-3 wt % of a main crosslinking agent, 0.1-1.5 wt % of an antistatic agent, 0.1-1.5 wt % of $TiO_2$ nanoparticles and 94-99.7 wt % of $TiO_2$ microparticles, and mixing aforesaid ingredients evenly in a kneader at a low temperature to produce a mixture;
   2) mixing 100 PHR (parts per hundred resin) of a polyolefin composition resin, 0.1-35 PHR of the mixture obtained from step 1), 0.01-2 PHR of an auxiliary crosslinking agent, 0.1-15 PHR of a lubricant, 0.1-5 PHR of an antioxidant, 0.1-3 PHR of a UV absorber and 0.1-30 PHR of a filler in a mixer to evenly mixed as a resultant mixture, and introducing the resultant mixture into another kneader for further mixing;
   3) allowing the mixture of step 2) at a temperature of 150-220° C. to proceed a preliminary gelation and crosslinking through a mixing roll;
   4) introducing the uniformly gelled mixture of step 3) to a calender machine controlled at a temperature of 170-200° C. for calendering to produce a hot-melted sheet whose thickness is controlled between 0.05 mm and 1.0 mm;
   5) optionally embossing the hot-melted sheet of step 4) with an embossing apparatus; and
   6) introducing the hot-melted sheet to a cooling roller set to cool the hot-melted sheet and fix a shape thereof, and rolling up the cooled sheet as a finished product.

3. The method for producing a weather-resistant crosslinked polyolefin sheet produced through a calender machine as defined in claim 2, wherein the polyolefin composition resin of step 2) includes two or more selected from the group consisting of polyethylene (PE), polypropylene (PP) and ethylene-vinyl acetate (EVA) copolymer having VA content ranging between 18% and 33%.

4. The method for producing a weather-resistant crosslinked polyolefin sheet produced through a calender machine as defined in claim 2, wherein the main crosslinking agent of step 1) is a kind of organic peroxide whose decomposition temperature lies between 110 and 220° C. and whose half-life is 10 minutes.

5. The method for producing a weather-resistant crosslinked polyolefin sheet produced through a calender machine as defined in claim 4, wherein the main crosslinking agent is 2,5-dimethyl-2,5-bis(tert-butylperoxy)-3-hexyne or α,α'-di-tert-butylperoxy-1,4-diisopropylbenzene.

6. The method for producing a weather-resistant crosslinked polyolefin sheet produced through a calender machine as defined in claim 2, wherein the auxiliary crosslinking agent of step 2) is one or a mixture of diene, triene or tetraene compounds having two C—C terminal double bonds.

7. The method for producing a weather-resistant crosslinked polyolefin sheet produced through a calender machine as defined in claim 2, wherein the auxiliary crosslinking agent of step 2) is a triallyl isocyanurate or a trimethylolpropane triacrylate.

8. The method for producing a weather-resistant crosslinked polyolefin sheet produced through a calender machine as defined in claim 2, wherein the UV absorber of step 2) is one or a mixture of a benzophenone UV absorber, a benzotriazole UV absorber and a hindered amine UV absorber.

9. The method for producing a weather-resistant crosslinked polyolefin sheet produced through a calender machine as defined in claim 2, wherein the antistatic agent of step 1) is one or a mixture of an ethoxy glycerol fatty acid ester derivative, a phosphate ester derivative, an aliphatic amine derivative and other alcohol derivatives.

10. The method for producing a weather-resistant crosslinked polyolefin sheet produced through a calender machine as defined in claim 2, wherein the lubricant of step 2) contains 40-70 wt % of an external lubricant and 30-60 wt % of an internal lubricant, based on the total weight of the lubricant.

11. The method for producing a weather-resistant crosslinked polyolefin sheet produced through a calender machine as defined in claim 10, wherein the external lubricant is $C_{12-18}$ fatty acid-based lubricant and the internal lubricant is fatty acids higher than $C_{20}$ or paraffin hydrocarbon-based lubricant.

12. The method for producing a weather-resistant crosslinked polyolefin sheet produced through a calender machine as defined in claim 2, wherein the antioxidant of step 2) is one or a mixture of a hindered phenol antioxidant and a phosphite antioxidant.

13. The method for producing a weather-resistant crosslinked polyolefin sheet produced through a calender machine as defined in claim 2, wherein the filler of step 2) is one or a mixture of calcium carbonate, clay, talcum powder, mica powder, limestone and silicon flour.

14. A weather-resistant crosslinked polyolefin sheet made by the method of claim 2.

* * * * *